March 17, 1970            J. B. KENNEDY            3,500,534
METHOD OF MAKING A SLOW-WAVE STRUCTURE ENCASEMENT
Original Filed Feb. 23, 1966            2 Sheets-Sheet 1
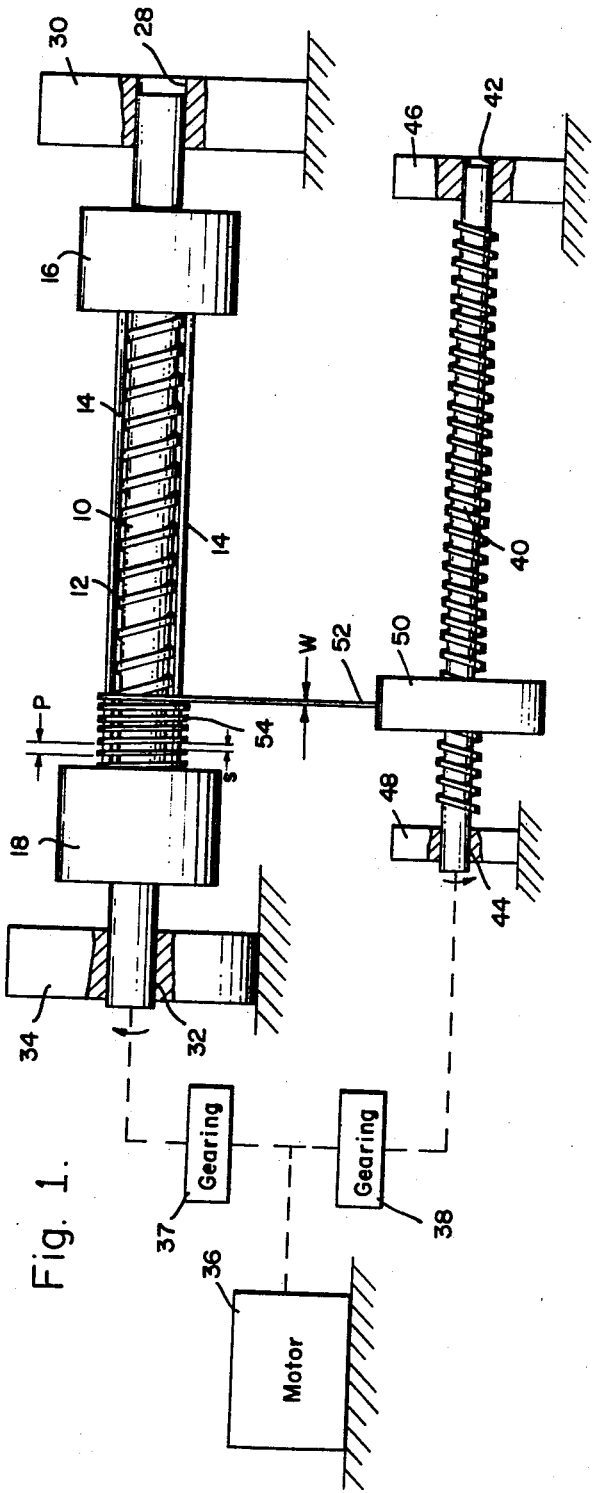
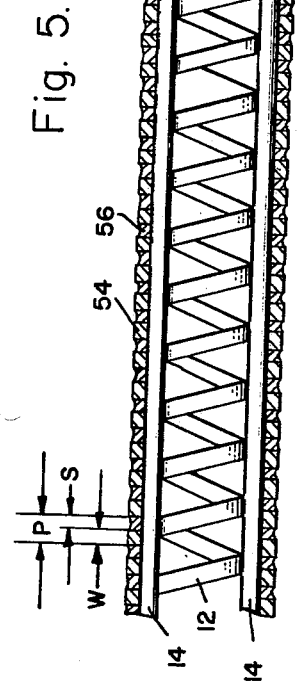
Joseph B. Kennedy,
INVENTOR.
BY.
Paul M. Coble
ATTORNEY.

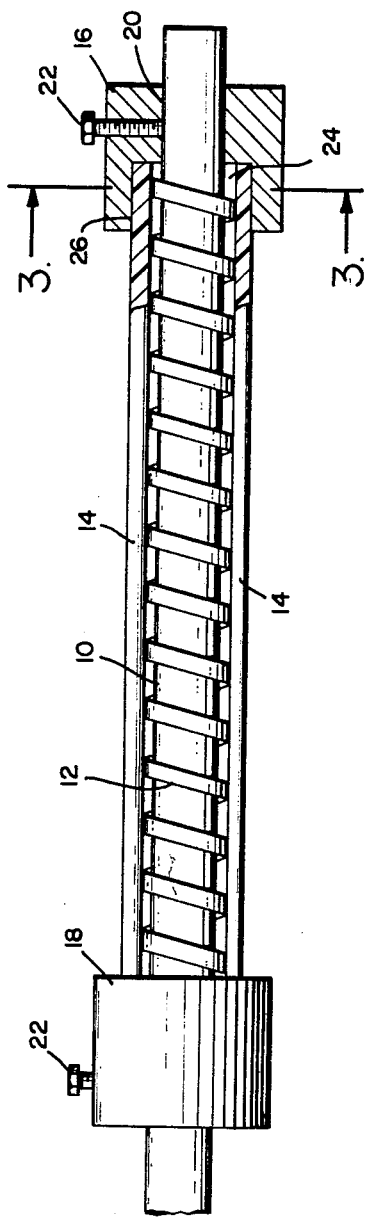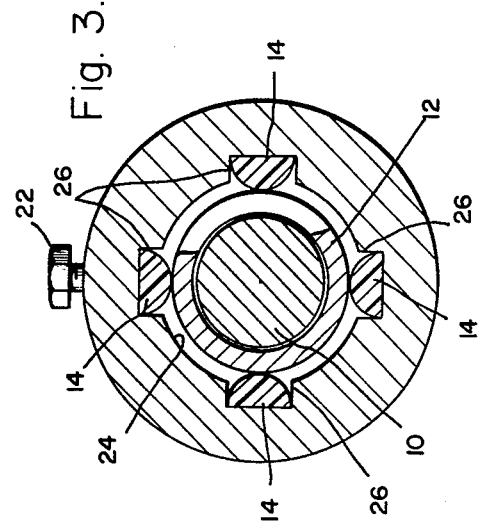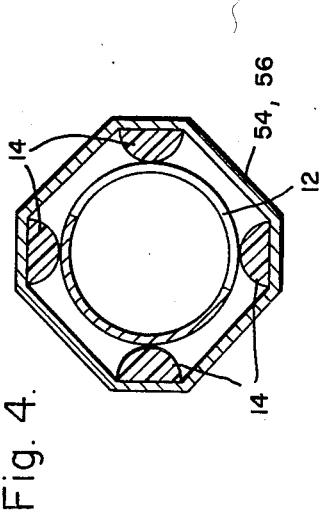

United States Patent Office 3,500,534
Patented Mar. 17, 1970

3,500,534
METHOD OF MAKING A SLOW-WAVE STRUCTURE ENCASEMENT
Joseph B. Kennedy, Palos Verdes Peninsula, Calif., assignor to Hughes Aircraft Company, Culver City, Calif., a corporation of Delaware
Original application Feb. 23, 1966, Ser. No. 529,517, now Patent No. 3,435,273. Divided and this application May 9, 1968, Ser. No. 736,898
Int. Cl. H01p *11/00;* H01q *13/00, 17/00*
U.S. Cl. 29—600                                        2 Claims

ABSTRACT OF THE DISCLOSURE

In the disclosed method for making a wrapped enveloping barrel for a slow-wave structure-support rod assembly, a predetermined width strip of selected material is wound around the assembly in a manner leaving a preselected spacing between successive windings of the strip. A layer of filler material is then placed over the strip windings, after which the assembly is heated to melt the filler material and then cooled to allow the filler material intermediate the strip windings to become sealed to the strip and to the support rods. The filler material has a thermal coefficient of expansion related to that of the strip material and to the strip width and spacing so as to provide a net thermal coefficient of expansion essentially equal to that of the support rods.

---

This is a division of application Ser. No. 529,517, filed Feb. 23, 1966, Patent No. 3,435,273.

This invention relates to a method for the encasement of devices in an envelope having thermal expansion properties essentially the same as the device material. In particular, the invention relates to fabricating a sealed envelope for a slow-wave structure of the type used in a traveling-wave tube.

In electron beam tubes of the traveling-wave type, a stream of electrons is caused to interact with a propagating electromagnetic wave in a manner which amplifies the electromagnetic wave energy. In order to achieve the desired interaction, the electromagnetic wave is propagated along a slow-wave structure, such as an electrically conductive helix wound about the path of the electron stream. The slow-wave structure provides a path of propagation for the electromagnetic wave which is considerably longer than the axial length of the structure so that the traveling-wave may be made to effectively propagate at nearly the velocity of the electron stream. Slow-wave structures of the helix type are usualy supported within a vacuum envelope by means of a plurality of equally circumferentially spaced electrically insulating rods disposed between the slow-wave structure and the envelope.

A method which has been used to mount a slow-wave structure and its support rods within the envelope involves making the envelope in the form of a resilient tubular metallic clamp. The cross-section of the clamp is initially circular, with a cross-sectional area greater than that of the structure-rod assembly to be inserted within the clamp, but with a normal diameter which is less than that of the circle circumscribing the structure-rod assembly. The clamp is first distorted by forces applied at a number of points corresponding to the number of rods so as to produce a geometric configuration more nearly identical to that of the structure-rod assembly. The structure-rod assembly is then inserted into the distorted clamp with the rods intermediate the points of application of the forces. Upon removal of the distorting forces, the clamp restores itself to nearly its original circular shape, and in doing so compresses the rods and the slow-wave structure into a rigid assembly.

Since, with slow-wave structure assemblies made in accordance with the foregoing technique, the envelope and the support rods are merely in abutting contact with one another rather than being bonded or fused together, relatively poor heat transfer properties are provided between the rods and the envelope. Moreover, with such an arrangement it is difficult to obtain uniform thermal interfaces between the rods and the envelope not only for different similarly dimensioned tubes of the same configuration, but even throughout a single individual tube, because slight dimensional irregularities can result in substantial changes in heat transfer properties.

Attempts have been made to improve the thermal properties of rod-envelope interfaces by brazing the envelope to the support rods. However, since the envelope material differs from the material comprising the support rods, differences in the thermal coefficients of expansion of the two materials subject the rods to tensile or compressive stresses when the assembly is exposed to significant temperature changes such as those which occur during the cooling period subsequent to the brazing operation. Such stresses can result in breakage of the support rods, especially for some of the longer slow-wave structures presently being used.

Accordingly, it is an object of the present invention to provide a method for encasing a slow-wave structure and its support rods in an envelope providing improved heat transfer properties between the envelope and the support rods, while at the same time minimizing any tendency for breakage of the support rods as a result of temperature-induced stresses.

It is a further object of the present invention to provide a method for encasing a device, such as a plurality of support rods disposed about a slow-wave structure, having given material extending along the perimeter of the device in an envelope which is especially constructed to possess thermal expansion properties essentially the same as the given material.

It is a still further object of the present invention to provide a method for fabricating a slow-wave structure mounting and encasing assembly which has more uniform heat transfer properties throughout both a given individual assembly and different similarly dimensioned assemblies of the same configuration than has been achievable with the prior art.

It is still another object of the present invention to provide a method for fabricating an envelope for an assembly of a plurality of support rods circumferentially disposed about a slow-wave structure, and which envelope processes a smaller cross-sectional area than that required by prior art envelopes for the same-sized assembly, thereby allowing greater magnetic focusing to be provided in the slow-wave structure region.

It is yet another object of the present invention to provide a simple, efficient and reliable method for encasing a slow-wave structure and its support rods in an envelope having the advantageous features set forth above.

In accordance with the objects outlined above, the present invention provides a sealed encasement of a device having a given material extending along the perimeter of the device in a predetermined direction in an envelope having thermal expansion properties essentially the same as that of the given material. The envelope includes a plurality of first regions of a selected material disposed about the perimeter of the given material and intersecting a line parallel to the predetermined direction at spaced locations along the line. Each of the first regions has a predetermined extent along the line and is spaced from the next successive first region by a predetermined spacing along the line. A plurality of second regions of a material different from the selected material are disposed about the perimeter of the given material between successive ones of the first regions, the second regions being sealed to the first regions and to the given material. The relative extent of the first and second regions along the aforesaid line is such that the net thermal coefficient of expansion of the envelope is essentially equal to the thermal coefficient of expansion of the given material.

In fabricating an envelope in accordance with the method of the present invention, at least a portion of the outer surface of the given material is first metallized. A strip of predetermined width of a material having a predetermined thermal coefficient of expansion is wound around the metallized surface of the given material in a manner leaving a preselected spacing between successive windings of the strip. A layer of filler material having a thermal coefficient of expansion related to the thermal coefficient of expansion of the strip material and to the strip width and the preselected spacing so as to provide the desired net thermal coefficient of expansion for the envelope is then applied over the windings of the strip and outwardly facing metallized surfaces of the given material not covered by the strip. The assembly is then heated to a temperature sufficient to melt the filler material, after which it is cooled to allow the filler material intermediate the windings of the strip to become sealed to the strip and to the given material.

Additional objects, advantages and characteristic features of the present invention will become readily apparent from the following detailed description of the invention when considered in conjunction with the accompanying drawings in which:

FIG. 1 is a simplified diagrammatic illustration of apparatus which may be employed in making an envelope for a slow-wave structure assembly in accordance with the present invention;

FIG. 2 is a longitudinal view, partly broken away into section, of a portion of the apparatus of FIG. 1;

FIG. 3 is a cross-sectional view taken along line 3—3 of FIG. 2;

FIG. 4 is a cross-sectional view of an encased slow-wave structure assembly provided in accordance with the present invention; and FIG. 5 is a longitudinal view, with the envelope shown in section, of the assembly of FIG. 4.

Referring to FIG. 1 with greater particularity, apparatus for encasing a slow-wave structure in accordance with the principles of the present invention may be seen to include a mandrel 10 on which there is carried a slow-wave structure 12 to be encased. Although the slow-wave structure 12 is illustrated as a simple helix, it is to be understood that the principles of the present invention are equally applicable to the encasement of the other forms of slow-wave structures, for example, contrawound helices, cloverleaf structures, ring-bar structures, etc. Disposed about the slow-wave structure 12 at equally spaced circumferential locations therearound are a plurality of support rods 14 of dielectric material such as ceramic extending in a direction parallel to the mandrel 10. The support rods 14 are secured to the slow-wave structure 12, for example, by brazing, prior to mounting the assembly comprising the slow-wave structure 12 and the rods 14 on the mandrel 10. It is pointed out that although the assembly is illustrated as having four support rods 14, the principles of the present invention are equally applicable to encasing slow-wave structure assemblies having any number of support rods not less than three.

The assembly comprising the slow-wave structure 12 and the support rods 14 is securely held on the mandrel 10 by a pair of identical collars 16 and 18 disposed at opposite ends of the assembly, the mounting of the assembly within the collars 16 and 18 being illustrated more fully in FIGS. 2 and 3. As is shown in FIG. 2, the collar 16 defines a cylindrical bore 20 extending longitudinally through the collar 16. The bore 20 has a diameter sufficient to snugly accommodate the mandrel 10, and a radial set screw 22 is provided in the collar 16 to secure the collar 16 to the mandrel 10. The longitudinal bore 20 has a portion 24 of enlarged diameter in a region adjacent the inner end surface of the collar 16, the diameter of the enlarged portion 24 being sufficient to accommodate the slow-wave structure 12. A plurality of radially extending indentations, or recesses, 26 (FIG. 3) are provided along the circumferential surface of the enlarged bore portion 24. The number, extent, and location of the indentations 26 are selected so as to snugly accommodate the desired number, dimensions and locations of the support rods 14.

The end of the mandrel 10 extending beyond the collar 16 is journaled in a bore 28 through a support member 30. Similarly, the opposite end of the mandrel 10 which extends beyond the collar 18 is journaled in a bore 32 through a support member 34. The mandrel 10 is driven from a motor 36 by means of a suitable gearing 37.

Also driven from the motor 36 by means of suitable gearing 38 is a threaded rod 40 mounted parallel to and substantially coextensive with the mandrel 10. The ends of the rod 40 are journaled in respective bores 42 and 44 through support members 46 and 48, respectively. A spool-like dispenser 50 containing envelope-forming tape 52 in rolled form is mounted on the threaded rod 40. The dispenser 50 is provided with a threaded axial bore, the threads of which mesh with the threads of the rod 40 so that when the rod 40 is rotated in the direction indicated in FIG. 1 the dispenser 50 is moved longitudinally along the rod 40 from the support 48 toward the support 46.

As has been indicated above, it is desired that the resultant envelope for the slow-wave structure assembly possess thermal expansion properties which are the same as that of the support rods 14. This is accomplished in accordance with the principles of the present invention by constructing the envelope in the form of a helix-like winding of a tape 54 of a selected material, with a predetermined spacing S being provided between successive windings of the tape 54, and with a filler material 56 (FIG. 5) disposed in the space between the windings of the tape 54. The tape 54 has a width W and is wound about the support rod 14 with a pitch P (the axial distance in which the tape 54 makes one complete revolution about the mandrel 10) which is greater than the tape width W by the spacing S. The material comprising one portion of the envelope (winding 54 or filler 56) has a thermal coefficient of expansion greater than that of the rods 14, while the material used for the other portion of the envelope has a thermal coefficient of expansion less than that of the rods 14. The relative width W of the tape 54 and the spacing S between the tape windings are selected so that the net dimensional change of a portion of the composite envelope 54, 56 extending in a direction parallel to the rods 14 over a length equal to the pitch P is essentially equal to the dimensional change of an equal length portion of the rods 14 for a given change in temperature.

The desired interrelationship between the spacing S and the tape width W in terms of the thermal coefficients of expansion of the materials used may be determined as follows. As the temperature of a material is raised from an initial temperature $T_1$ to a higher temperature $T_2$, the material undergoes an expansion per unit length $e$ given by $$e = \alpha(T_2 - T_1) \quad (1)$$

where $\alpha$ is the thermal coefficient of expansion of the material in expansion per unit length per degree centigrade. As may be readily seen from FIG. 5, at the initial temperature $T_1$ the tape width W and spacing S satisfy the relationship $$W + S = P \quad (2)$$

However, when the temperature is raised from $T_1$ to $T_2$, the tape 54 will undergo an expansion $e_T$, the filler material 56 will undergo an expansion $e_F$, and the rods 14 will undergo an expansion $e_R$. Thus, at the temperature $T_2$ the relationship becomes $$W(1+e_T) + S(1+e_F) = P(1+e_R) \qquad (3)$$

Substituting Equation 2 into Equation 3, and solving for the ratio $S/W$ gives $$\frac{S}{W} = \frac{e_T - e_R}{e_R - e_F} \qquad (4)$$

Then, substituting Equation 1 into Equation 4 yields $$\frac{S}{W} = \frac{\alpha_T - \alpha_R}{\alpha_R - \alpha_F} \qquad (5)$$

which is the desired relationship between the ratio of the spacing S to the tape width W in terms of the thermal coefficients of expansion $\alpha_T$, $\alpha_R$, and $\alpha_F$ for the tape material, the rod material, and the filler material respectively. It may be observed from Equation 5 that as long as one of the coefficients $\alpha_T$ or $\alpha_F$ is greater than the coefficient $\alpha_R$ and the other of the coefficients $\alpha_T$ or $\alpha_F$ is less than $\alpha_R$, the ratio $S/W$ is positive.

As an example of a particular combination of materials which may be employed in forming an envelope in accordance with the principles of the present invention, molybdenum may be used for the tape 54, beryllia for the rods 14, and copper for the filler material 56. Using as the respective thermal coefficients of expansion for molybdenum, beryllia and copper values of $6.5 \times 10^{-6}$, $8.9 \times 10^{-6}$ and $20.3 \times 10^{-6}$ per °C., respectively, and substituting these values for the respective quantities $\alpha_T$, $\alpha_R$ and $\alpha_F$ in Equation 5 yields a value of .21 for the desired ratio of spacing S to tape width W. A molybdenum tape having a width W of .012 inch, for example, would thus be wound so as to leave a spacing S of .0025 inch between the tape windings. It is pointed out that the specific materials and dimensions set forth above are given solely for purposes of illustration, and other materials and different dimensions are also suitable so long as Equation 5 is satisfied.

When using the apparatus of FIG. 1 to fabricate a slow-wave structure envelope in accordance with the principles discussed above, the helix-like winding 54 may be formed from the tape 52 dispensed from the spool-like dispenser 50. The gearing 37 and 38 and the thread pitch of the threaded rod 40 are selected so that the dispenser 50 moves longitudinally by an amount equal to the desired pitch P for each complete revoltuion of the mandrel 10. For example, if the threads of the rod 40 are constructed with a pitch equal to the desired pitch P, then the gearing 37 and 38 is made to rotate the rod 40 at the same rate as the mandrel 10; whereas if the threads of the rod 40 have a pitch equal to twice the desired pitch P, then the gearing 37 and 38 is caused to rotate the rod 40 at a rate equal to half the rate of rotation of the mandrel 10.

In carrying out the encasement of a slow-wave structure and its support rods in accordance with the method of the present invention, a longitudinally extending portion of the surface of each of the rods 14 is first metallized, with a coating of a molybdenum-manganese mixture, for example, to permit the subsequent brazing of the envelope to the rods. The surface of each of rods 14 essentially circumferentially opposite the metallized portion is then bonded to the slow-wave structure 12 by conventional methods, such as brazing. The assembly is then inserted on the mandrel 10, with the rods 14 fitting into the recesses 26 in the collars 16 and 18, and the set screws 22 are tightened to rigidly secure the assembly to the mandrel 10.

The dispenser 50 which has been filled with a roll of tape 52 of suitable material is moved to the end of the rod 40 adjacent the support 48, and the end of the tape 52 projecting out of the dispenser 50 is secured to one of the rods 14 at a point adjacent the collar 18. The motor 36 is then turned on to rotate the mandrel 10 and the threaded rod 40. The dispenser 50 moves longitudinally along the rod 40 toward the support 46, causing the tape 52 to be wound about the rods 14 and form the helix-like configuration 54 of the desired pitch P. When the tape 52 has reached the end of the rods adjacent the collar 16 the motor is stopped, and the end of the tape is secured to one of the rods 14.

The assembly consisting of the rods 14, the slow-wave structure 12 and the wound tape 54 is removed from the apparatus and is covered with a layer of the desired filler material 56. One method for applying the filler material 56 to the assembly is to wrap a sheet of the material 56 around the outer surfaces of the wound tape 54. An alternate method involves spraying the filler material uniformly over the wound tape 54 and outwardly facing surfaces of the rods 14 not covered by the tape 54.

The assembly is then heated in an inert or a reducing atmosphere, for example hydrogen gas, to a temperature slightly above the melting point of the filler material 56 to cause the filler material to melt and flow into the space between the windings of the tape 54. The assembly is then cooled to solidify the molten filler material and thereby bond the wound tape 54 to the rods 14 in vacuum tight relationship. As a result of selection of materials having thermal coefficients of expansion in accordance with Equation 5, the space between the windings of the tape 54 is filled with a material which provides an envelope having a net thermal coefficient of expansion equal to the thermal coefficient of expansion of the rods 14.

A completed envelope formed in accordance with the present invention is shown in FIGS. 4 and 5. Although the support rods 14 are illustrated in FIG. 4 as being semicircular in cross-section, with their curved surfaces contacting the slow-wave structure 12, it is pointed out that support rods of other cross-sections such as circular may be employed instead. The illustrated configuration, however, does afford a minimization of support rod cross-sectional area while ensuring that the resultant envelope will not contact the slow-wave structure 12.

It will be apparent that while the present invention is particularly suited to encasing a slow-wave structure and its support rods in a vacuum envelope, the principles of the invention may be employed to encase any device having a given material extending along the perimeter of the device in an envelope having essentially the same thermal expansion properties as the given material. Thus, although the invention has been shown and described with reference to a specific method, apparatus, and resultant device, nevertheless various changes and modifications obvious to a person skilled in the art to which the invention pertains are deemed to lie within the spirit and scope of the invention as set forth in the appended claims.

What is claimed is:

1. A method for assembling a plurality of rods of given material about the perimeter of a slow-wave structure and for encasing the assembly in an envelope having thermal expansion properties essentially the same as that of said given material, said method comprising the steps of: metallizing a longitudinally extending portion of the surface of each of said rods, bonding a surface of each of said rods essentially circumferentially opposite the metallized portion to portions of the perimeter of said slow-wave structure, winding a strip of predetermined width of a material having a predetermined thermal coefficient of expansion around the metallized surfaces of said rods in a manner leaving a preselected spacing between successive windings of said strip, applying a layer of filler material having a preselected thermal coefficient of expansion related to said predetermined thermal coefficient of expansion and to said predetermined width and said preselected spacing to provide a net thermal coefficient of expansion for said envelope essentially the same as the thermal coefficient of expansion of said given material over the windings of said strip and outwardly facing metallized surfaces of said rods not covered by said strip, sealing the said preselected spacing between the successive windings of said strip by heating the assembly to a temperature sufficient to melt and flow said filler material against said strip and said rods, and cooling the assembly to solidify the filler material.

2. A method according to claim 1 wherein the heating step is carried out in a reducing atmosphere.

References Cited

UNITED STATES PATENTS

| | | | |
|---|---|---|---|
| 2,434,511 | 1/1948 | Ostermaw et al. | 29—605 |
| 2,869,015 | 1/1959 | Bolz | 29—25.11 |
| 3,196,523 | 7/1965 | Bell | 29—605 |
| 3,239,784 | 3/1966 | Schwartz | 29—605 XR |
| 3,273,226 | 9/1966 | Brown et al. | 29—605 XR |

CHARLIE T. MOON, Primary Examiner

R. W. CHURCH, Assistant Examiner

U.S. Cl. X.R.

29—25, 14, 456, 605, 500; 333—29, 31